United States Patent
Ji et al.

(10) Patent No.: US 11,026,162 B2
(45) Date of Patent: Jun. 1, 2021

(54) SYSTEM MESSAGE INDICATION METHOD, APPARATUS, AND SYSTEM

(71) Applicant: HUAWEI TECHNOLOGIES CO., LTD., Guangdong (CN)

(72) Inventors: Tong Ji, Beijing (CN); Baokun Shan, Beijing (CN); Zhe Jin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/787,582

(22) Filed: Feb. 11, 2020

(65) Prior Publication Data
US 2020/0178160 A1 Jun. 4, 2020

Related U.S. Application Data

(63) Continuation of application No. PCT/CN2017/097270, filed on Aug. 11, 2017.

(51) Int. Cl.
H04W 48/12 (2009.01)

(52) U.S. Cl.
CPC ................... H04W 48/12 (2013.01)

(58) Field of Classification Search
CPC .................................................. H04W 48/12
See application file for complete search history.

(56) References Cited

U.S. PATENT DOCUMENTS

| | | | |
|---|---|---|---|
| 2008/0212522 A1* | 9/2008 | Ko | H04W 48/12 370/328 |
| 2011/0117912 A1* | 5/2011 | Mahajan | H04W 48/12 455/434 |
| 2019/0246337 A1* | 8/2019 | Viorel | H04W 4/70 |

FOREIGN PATENT DOCUMENTS

| | | |
|---|---|---|
| CN | 106954257 A | 7/2017 |
| WO | 2015110165 A1 | 7/2015 |
| WO | 2017028024 A1 | 2/2017 |
| WO | 2017054007 A1 | 3/2017 |
| WO | 2017078023 A1 | 5/2017 |
| WO | 2017119838 A1 | 7/2017 |

OTHER PUBLICATIONS

Extended European Search Report issued in European Application No. 17920757.6 dated Jul. 3, 2020, 12 pages.
Nokia et al., "Reduced system acquisition time," 3GPP TSG RAN WG1 Meeting #88-bis, R1-1705037, Spokane, USA, Apr. 3-7, 2017, 4 pages.
PCT International Search Report and Written Opinion issued in International Application No. PCT/CN2017/097270 dated May 3, 2018, 17 pages (with English translation).

* cited by examiner

*Primary Examiner* — Marisol Figueroa
(74) *Attorney, Agent, or Firm* — Fish & Richardson P.C.

(57) ABSTRACT

This application provides a system message indication method, an apparatus, and a system. The method may include generating, by a network device, notification information. The notification information may indicate status information of first information, the first information may include at least one bit in a first system message, and a quantity of bits included in the first information may be less than a quantity of bits included in the first system message. The method may also include sending, by the network device, the notification information to a terminal device.

18 Claims, 3 Drawing Sheets

SYSTEM MESSAGE INDICATION METHOD, APPARATUS, AND SYSTEM

CROSS-REFERENCE TO RELATED APPLICATIONS

This application is a continuation of International Application No. PCT/CN2017/097270, filed on Aug. 11, 2017, the disclosure of which is hereby incorporated by reference in its entirety.

TECHNICAL FIELD

This application relates to the field of communications technologies, and in particular, to a system message indication method, an apparatus, and a system.

BACKGROUND

A 3rd generation partnership project (3rd Generation Partnership Project, 3GPP) standard is based on a cellular network, and is used to bear an internet of things (Internet of Things, IoT) service by designing a new air interface and using a characteristic of a narrowband technology. This type of IoT is referred to as a narrowband internet of things (Narrow Band-Internet of Things, NB-IoT). Compared with a conventional cellular network, a data packet generated by an NB-IoT network service is smaller, a data transmission period is longer, and costs of a terminal device of the NB-IoT are lower. Usually, a large quantity of terminal devices may be served by one NB-IoT base station, to implement massive deployment of the terminal devices.

Currently, in the NB-IoT, when a system message is changed, an NB-IoT base station notifies a terminal device by using a direct indication (direct indication) or a paging message (paging message). The direct indication may exist in a physical downlink control channel (Physical Downlink Control Channel, PDCCH), and the paging message may exist in a physical downlink shared channel (Physical Downlink Shared Channel, PDSCH). However, after receiving the change notification, the terminal device re-reads content in a master information block (Master Information Block, MIB) and a system information block 1 (System Information Block 1, SIB 1), and selectively reads content of another system message. On one hand, because content of only some fields in the content in the MIB and the SIB 1 is frequently changed, and other fields are relatively stable and remain unchanged, the terminal device re-reads all the content in the MIB and the SIB 1 each time, and working efficiency is low. On the other hand, because a narrowband technology is used in the NB-IoT, a delay of reading the system message by the terminal device is long, and therefore power consumption is high and costs are high. It can be learned that there is room and a need for optimization in a procedure of changing an existing system message of the NB-IoT.

SUMMARY

Embodiments of this application provide a system message indication method, an apparatus, and a system, to reduce a delay of updating a system message by a terminal device, and reduce power consumption.

To achieve the foregoing objective, the following technical solutions are used in the embodiments of this application.

According to a first aspect, an embodiment of this application provides a system message indication method. The method includes the following steps.

A network device generates notification information, where the notification information is used to indicate status information of first information in a first system message; and sends the notification information to a terminal device. The first information includes at least one bit in the first system message, and a quantity of bits included in the first information is less than a quantity of bits included in the first system message. Therefore, the terminal device may no longer need to read all content of the changed first system message, and may update a locally stored first system message based on the notification information. This helps reduce a delay of updating the first system message by the terminal device, and reduce power consumption.

Usually, the first information may be set to frequently changed information in the first system message, so that a probability that the terminal device reads the changed first system message can be reduced, a delay of updating the first system message by the terminal device can be reduced, and power consumption can be reduced.

In a possible design, that the notification information is used to indicate status information of first information includes: the notification information is used to indicate whether the first information is changed and/or is used to indicate a value of the first information. In this way, different status information of the first information may be set to adapt to different change statuses of the first system message.

In a possible design, the notification information is further used to indicate whether second information is changed, and the second information includes at least one bit that is in the first system message and that is other than the first information. In this way, the terminal device may determine, depending on whether the second information is changed, whether to directly update the locally stored first system message based on the notification information or update the locally stored first system message based on the changed first system message.

In a possible design, the first system message is a MIB, and the first information includes frequently changed information in the MIB. For example, the first information includes at least one of a first tag value, a system frame number, a first hyper frame number, and SIB 1 scheduling information.

For example, the first information may include the first tag value and the second information may be at least one bit that is in the MIB and that is other than the first tag value, and the second information may specifically include the system frame number, and/or the first hyper frame number, and/or the SIB 1 scheduling information, and/or other information. In this case, because the first tag value in the MIB includes five bits, the notification information may be set to include five bits, and the five bits are used to indicate a value of the first tag value. In addition, the notification information may further include one bit, where the bit is used to indicate whether information that is in the MIB and that is other than the first tag value is changed. It should be noted that the first information may further include the first tag value and the system frame number, and the second information may include the first hyper frame number, and/or the SIB 1 scheduling information, and/or other information. The rest may be deduced by analogy. Content specifically included in the first information and the second information and specific content included in the notification information are not limited in this embodiment of this application.

In a possible design, the first system message is a SIB 1, and the first information includes frequently changed information in the SIB 1. For example, the first information includes at least one of a second tag value, a second hyper frame number, and second SI scheduling information.

For example, the first information may include the second tag value; and the second information may be at least one bit that is in the SIB 1 and that is other than the second tag value, and may specifically include the second hyper frame number, and/or the second SI scheduling information, and/or other information. It should be noted that because a maximum of eight pieces of second SI can be invoked in the SIB 1, each piece of second SI corresponds to one second tag value, and each second tag value includes two bits. Therefore, the notification information may be set to include N*2 bits, where N is a quantity of pieces of second SI included in the SIB 1. The notification information may be set as every two bits indicating a value of a second tag value corresponding to one piece of second. SI in the SIB 1. Optionally, the notification information may alternatively be set to include N bits, and each bit is used to indicate whether a second tag value corresponding to one piece of second SI in the SIB 1 is changed. In addition, the notification information may further include one bit, where the bit is used to indicate whether information that is in the SIB 1 and that is other than the second tag value is changed. It should be noted that the first information may further include the second tag value and the second hyper frame number, and the second information may be the second SI scheduling information, and/or other information. Content specifically included in the first information and the second information and specific content included in the notification information are not limited in this embodiment of this application.

In a possible design, the network device may use a dedicated message, a dedicated channel, or a dedicated signal to carry the notification information, or may use an existing message, channel, or signal to carry the notification information, for example, may use a direct indication message or a paging message to carry the notification information.

Specifically, the network device periodically sends the first system message. If the network device changes the first system message in this period, the network device sends a direct indication message or a paging message to a terminal device in a service area in a next system message change period, and the direct indication message or the paging message carries the notification information.

In a possible design, the notification information is used to indicate the value of the first tag value, and/or the notification information is used to indicate whether the second information that is in the first system message and that is other than the first tag value is changed.

For example, because in an NB-IoT, a first tag value may be understood as a version number of a MIB, when any piece of information (except some particular information agreed on in a protocol, for example, access and bearer control information) in a system message is changed, the first tag value is changed, that is, there is a high probability that the first tag value is changed. Therefore, the first information may be set to include the first tag value, and the notification information is used to indicate the value of the first tag value. Specifically, the notification information may be carried in the direct indication message. Because the first tag value in the MIB includes five bits, five bits in unused bits in the direct indication message may be used to indicate the value of the first tag value in the MIB. It should be noted that the "five bits" herein is merely an example, and a specific quantity of bits for indicating the value of the first information is not limited in this embodiment of this application.

For example, considering that information other than the first tag value may be changed in the MIB, when the first information is set to the first tag value, at least one bit that is in the MIB and that is other than the first tag value is set to the second information, and the second information may specifically include the system frame number, and/or the first hyper frame number, and/or the SIB 1 scheduling information, and/or other information. In this case, the notification information is used to indicate change content of the first tag value and whether the second information other than the first tag value is changed, Specifically, one bit in the unused bits in the direct indication message may be used to indicate whether the second information in the MIB is changed. If a value of the bit is "0", it indicates that the second information in the MIB is not changed. If a value of the bit is "1", it indicates that the second information in the MIB is changed.

For example, in addition to the first tag value, the SIB 1 scheduling information in the MIB may also be changed. In this case, the first information may further be set to include the first tag value and the SIB 1 scheduling information. Therefore, the notification information is used to indicate a value of the first tag value and a value of the SIB 1 scheduling information. Specifically, a new dedicated message may be added to carry the notification information. The five bits are used to indicate the value of the first tag value, and for example, four bits are used to indicate the value of the SIB 1 scheduling information. It should be noted that the five bits and the four bits herein are merely an example, and a specific quantity of bits for indicating the value of the first information and the value of the second information is not limited in this embodiment of this application. In addition, one bit may be further used to indicate whether other second information that is in the MIB and that is other than the first tag value and the SIB 1 scheduling information is changed. For a setting method, refer to the foregoing descriptions, and details are not described again.

According to a second aspect, an embodiment of this application provides a system information indication method. The method includes: receiving, by a terminal device, notification information sent by a network device, and updating content of a locally stored first system message based on the notification information.

The notification information is used to indicate status information of first information, the first information includes at least one bit in the first system message, and a quantity of bits included in the first information is less than a quantity of bits included in the first system information.

For example, if the notification information indicates a value of the first information, the terminal device updates content of the first information in the locally stored first system message to the value of the first information in the notification information. Optionally, the terminal device may continue to receive the changed first system message sent by the network device, or may no longer receive the changed first system message sent by the network device. This is not limited in this embodiment of this application.

If the notification information indicates that the first information is changed, and does not indicate the value of the first information, the terminal device receives the sent changed first system message, and changes, based on the received first system message, corresponding content in the locally stored first system message.

If the notification information indicates the value of the first information, and indicates whether second information is changed, the terminal device first determines whether the second information is changed. If the notification information indicates that the second information is not changed, the terminal device directly updates the content of the first information in the locally stored first system message based on the notification information. If the notification information indicates that the second information is changed, the terminal device receives the changed first system message, and updates the locally stored first system message based on the changed first system message.

In a possible design, that the notification information is used to indicate status information of first information includes: the notification information is used to indicate the value of the first information, and/or the notification information is used to indicate whether the first information is changed.

In a possible design, the notification information is further used to indicate whether the second information is changed, and the second information includes at least one bit that is in the first system message and that is other than the first information.

In a possible design, the terminal device reads the value of the first information in the notification information, to update the value of the first information in the locally stored first system message.

In a possible design, if the notification information indicates that the first information is changed, but does not indicate the value of the first information; or the notification information indicates that the second information is changed, the terminal device receives the changed first system message, and updates the content of the locally stored first system message based on the changed first system message.

In a possible design, the first system message is a MIB, and the first information includes at least one of a first tag value, a system frame number, a first hyper frame number, and SIB 1 scheduling information.

In a possible design, the first system message is a SIB 1, and the first information includes at least one of a second tag value, a second hyper frame number, and second system message scheduling information.

In a possible design, the terminal device receives a direct indication message sent by the network device, where the direct indication message carries the notification information; or the terminal device receives a paging message sent by the network device, where the paging message carries the notification information.

In a possible design, the notification information is used to indicate the value of the first tag value, and/or the notification information is used to indicate whether information that is in the first system message and that is other than the first tag value is changed.

According to a third aspect, an embodiment of this application provides a network device for sending a system message indication. The network device includes a processor and a transceiver. The processor is configured to generate notification information, where the notification information is used to indicate status information of first information, the first information includes at least one bit in a first system message, and a quantity of bits included in the first information is less than a quantity of bits included in the first system message. The transceiver is configured to send, to a terminal device, the notification information generated by the processor.

In a possible design, that the notification information is used to indicate status information of first information includes: the notification information is used to indicate whether the first information is changed, and/or the notification information is used to indicate a value of the first information.

In a possible design, the notification information is further used to indicate whether the second information is changed, and the second information includes at least one bit that is in the first system message and that is other than the first information.

In a possible design, the first system message is a master information block MIB or a system information block SIB 1.

In a possible design, the first system message is a MIB, and the first information includes at least one of a first tag value, a system frame number, a first hyper frame number, and SIB 1 scheduling information.

In a possible design, the first system message is a SIB 1, and the first information includes at least one of a second tag value, a second hyper frame number, and second system message scheduling information.

In a possible design, the transceiver is configured to send a direct indication message to the terminal device, where the direct indication message carries the notification information generated by the processor; or the transceiver is configured to send a paging message to the terminal device, where the paging message carries the notification information generated by the processor.

In a possible design, the notification information is used to indicate a value of the first tag value, and/or the notification information is used to indicate whether at least one bit that is in the first system message and that is other than the first tag value is changed.

According to a fourth aspect, an embodiment of this application provides a terminal device for receiving a system message indication. The terminal device includes a processor, a memory, and a transceiver. The transceiver is configured to receive notification information sent by a network device, where the notification information is used to indicate status information of first information, the first information includes at least one bit in a first system message, and a quantity of bits included in the first information is less than a quantity of bits included in the first system message. The processor is configured to change, based on the notification information received by the transceiver, content of the first system message stored in the memory.

In a possible design, that the notification information is used to indicate status information of first information includes: the notification information is used to indicate a value of the first information, and/or the notification information is used to indicate whether the first information is changed.

In a possible design, the notification information is further used to indicate whether second information is changed, and the second information includes at least one bit that is in the first system message and that is other than the first information.

In a possible design, the processor is further configured to read the value of the first information in the notification information.

In a possible design, the processor is configured to change, based on the first system message if the notification information indicates that the first information is changed, and/or the notification information indicates that the second information is changed, the content of the first system message stored in the memory.

In a possible design, the first system message is a master information block MIB or a system information block SIB 1.

In a possible design, the first system message is a MIB, and the first information includes at least one of a first tag value, a system frame number, a first hyper frame number, and SIB 1 scheduling information.

In a possible design, the first system message is a SIB 1, and the first information includes at least one of a second tag value, a second hyper frame number, and second system message scheduling information.

In a possible design, the transceiver is configured to receive a direct indication message sent by the network device, where the direct indication message carries the notification information; or the transceiver is configured to receive a paging message sent by the network device, where the paging message carries the notification information.

In a possible design, the notification information is used to indicate a value of the first tag value, and/or the notification information is used to indicate whether at least one bit that is in the first system message and that is other than the first tag value is changed.

According to a fifth aspect, an embodiment of the present invention provides a base station. The base station has a function of implementing behavior of the base station in the foregoing method design. The function may be implemented by using hardware, or may be implemented by hardware by executing corresponding software. The hardware or the software includes one or more modules corresponding to the foregoing function.

In a possible design, a structure of the base station includes a processor and a transmitter. The processor is configured to support the base station in performing a corresponding function in the foregoing method. The transmitter is configured to support communication between the base station and UE, and send, to the UE, information or an instruction in the foregoing method. The base station may further include a memory. The memory is configured to couple to the processor, and stores a program instruction and data that are necessary for the base station.

According to a sixth aspect, an embodiment of the present invention provides UE. The UE has a function of implementing behavior of the UE in the foregoing method design. The function may be implemented by using hardware, or may be implemented by hardware by executing corresponding software. The hardware or the software includes one or more modules corresponding to the foregoing function. The modules may be software and/or hardware.

In a possible design, a structure of the UE includes a receiver and a processor. The receiver is configured to support the UE in receiving a first DRX long cycle and a second DRX long cycle that are configured by the foregoing base station for the UE, and various instructions such as a. DRX activation instruction or a DRX deactivation instruction. The processor controls the UE to receive paging based on the first DRX long cycle, the DRX deactivation instruction, or the second DRX long cycle that is received by the receiver.

According to a seventh aspect, an embodiment of this application provides a computer-readable storage medium. The computer-readable storage medium stores an instruction, and when the instruction is run on a computer, the computer is enabled to perform the system message indication method according to any one of the first aspect or the second aspect.

According to an eighth aspect, an embodiment of this application provides a computer program product including an instruction. When the computer program product is run on a computer, the computer is enabled to perform the system message indication method according to any one of the first aspect or the second aspect.

According to a ninth aspect, a communications apparatus is provided. The communications apparatus may be the network device in the foregoing method designs, or a chip disposed in the network device. The communications apparatus includes: a memory, configured to store computer-executable program code; a communications interface; and a processor, where the processor is coupled to the memory and the communications interface. The program code stored in the memory includes an instruction, and when the processor executes the instruction, the communications apparatus is enabled to perform the method performed by the network device according to any one of the second aspect or the possible designs of the second aspect.

According to a tenth aspect, a communications apparatus is provided. The communications apparatus may be the network device in the foregoing method designs, or a chip disposed in the network device. The communications apparatus includes: a memory, configured to store computer-executable program code; a communications interface; and a processor, where the processor is coupled to the memory and the communications interface. The program code stored in the memory includes an instruction, and when the processor executes the instruction, the communications apparatus is enabled to perform the method performed by the network device according to any one of the third aspect or the possible designs of the third aspect.

According to an eleventh aspect, an embodiment of this application provides a system message indication system, and the system message indication system includes the network device according to the third aspect and the terminal device according to the fourth aspect.

The embodiments of this application provide the system message indication method, the apparatus, and the system. If the network device changes the first system message, the network device generates the notification information, where the notification information is used to indicate the status information of the first information, and the first information is the at least one bit in the first system message; and sends the notification information to the terminal device. Therefore, the terminal device may update the locally stored first system message based on the notification information. Compared with that in the prior art, the network device sends, to the terminal device, only a notification that the first system message is changed, after receiving the notification, the terminal device still needs to read all content of the changed first system message. Consequently, working efficiency is low, and a delay is long. However, in the embodiments of this application, if the frequently changed information in the first system message is set to the first information, in this case, the terminal device can update the locally stored first system message based only on the notification information. This helps reduce a probability that the terminal device reads all the content of the changed first system message; helps improve working efficiency of the terminal device, reduce a delay, and reduce power consumption; and helps reduce costs.

DESCRIPTION OF EMBODIMENTS

The following clearly describes the technical solutions in the embodiments of this application with reference to the accompanying drawings in the embodiments of this application.

Figure 1:
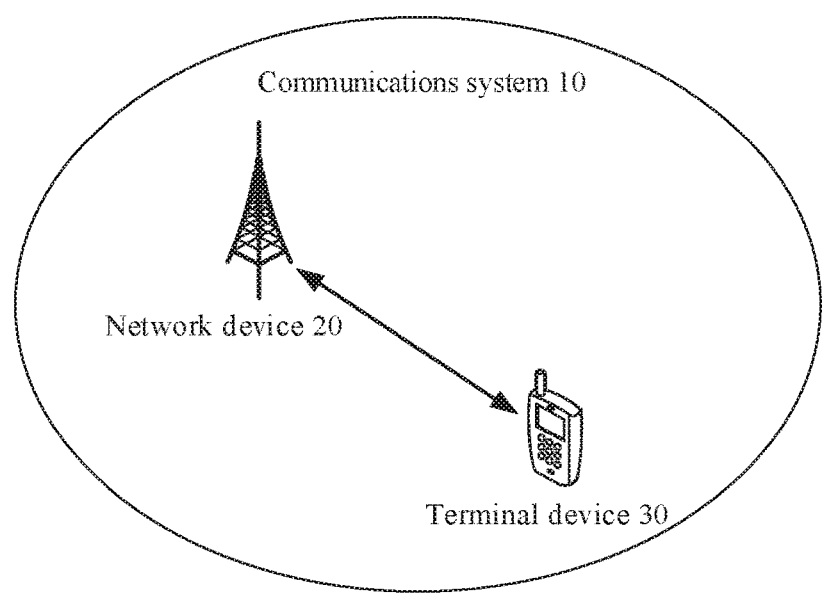
FIG. 1 is a network architectural diagram of a communications system according to an embodiment of this application.

As shown in FIG. 1, an embodiment of this application provides a communications system 10. The communications system includes a network device 20 and a terminal device 30.

The network device 20 is configured to send a system message to the terminal device 30, so that the terminal device 30 can send data based on the system message delivered by the network device 20. The network device 20 may be a base station, a base station controller, or the like in wireless communications. For example, the base station may be a base transceiver station (Base Transceiver Station, BTS) in a global system for mobile communications (Global System for Mobile Communication, GSM) or a code division multiple access (Code Division Multiple Access, CDMA) system, or a NodeB (NodeB) in a wideband code division multiple access (Wideband Code Division Multiple Access, WCDMA) system, an evolved NodeB eNB or an e-NodeB (evolutional Node B) in LTE, or the like. Alternatively, the base station may be an eNB in an IoT or an NB-IoT. This is not specifically limited in this embodiment of this application. Certainly, the network device 20 may alternatively be a device in another network, for example, the network device 20 may be a network device in a future 5th generation (5th generation, 5G) mobile communications network or a future evolved public land mobile network (Public Land Mobile Network, PLMN). This is not specifically limited in this embodiment of this application.

The terminal device 30 provides a voice and/or data connectivity service for a user. For example, the terminal device 30 may be user equipment (user equipment, UE), an access terminal device, a terminal device unit, a terminal device station, a mobile station, a mobile station, a remote station, a remote terminal device, a mobile device, a wireless communications device, a terminal device agent, a terminal device apparatus, or the like. The access terminal device may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (Public Land Mobile Network, PLMN). This is not limited in this embodiment of this application.

Figure 2:
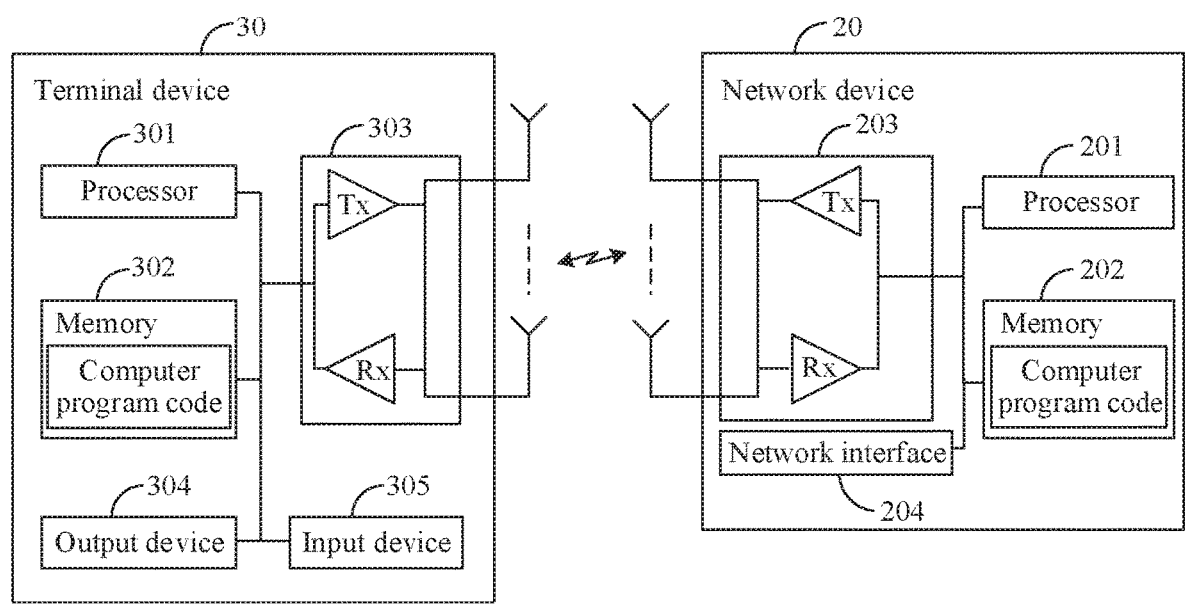
FIG. 2 is a schematic structural diagram of a network device and a terminal device according to an embodiment of this application.

As shown in FIG. 2, FIG. 2 is a schematic diagram of hardware structures of the network device 20 and the terminal device 30 according to an embodiment of this application.

The terminal device 30 includes at least one processor 301, at least one memory 302, and at least one transceiver 303. Optionally, the terminal device 30 may further include an output device 304 and an input device 305.

The processor 301, the memory 302, and the transceiver 303 are connected by using a bus. The processor 301 may be a general-purpose central processing unit (Central Processing Unit, CPU), a microprocessor, an application-specific integrated circuit (Application-Specific Integrated. Circuit, ASIC)), or one or more integrated circuits configured to control program execution in the solutions of this application. The processor 301 may alternatively include a plurality of CPUs, and the processor 301 may be a single-core (single-CPU) processor or a multi-core (multi-CPU) processor. The processor herein may be one or more devices, circuits, or processing cores configured to process data (for example, a computer program instruction).

The memory 302 may be a read-only memory (Read-Only Memory, ROM) or another type of static storage device that can store static information and an instruction, a random access memory (Random Access Memory, RAM), or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, and a Blu-ray disc, or the like), a magnetic disk storage medium or another magnetic storage device, or any other medium that can be used to carry or store expected program code in a form of an instruction or a data structure and that can be accessed by a computer. However, the memory 302 is not limited thereto. The memory 302 may exist independently, and is connected to the processor 301 by using the bus. The memory 302 may alternatively be integrated with the processor 301. The memory 302 is configured to store application program code for executing the solutions of this application, and the processor 301 controls the execution. The processor 301 is configured to execute computer program code stored in the memory 302, to implement the data transmission method according to this embodiment of this application.

The transceiver 303 may use any type of apparatus such as a transceiver, and is configured to communicate with another device or a communications network such as an Ethernet, a radio access network (Radio Access Network, RAN), or a wireless local area network (Wireless Local Area Networks, WLAN). The transceiver 303 includes a transmitter Tx and a receiver Rx.

The output device 304 communicates with the processor 301, and may display information in a plurality of manners. For example, the output device 304 may be a liquid crystal display (Liquid Crystal Display, LCD), a light emitting diode (Light Emitting Diode, LED) display device, a cathode ray tube (Cathode Ray Tube, CRT) display device, a projector (projector), or the like. The input device 305 communicates with the processor 301, and may receive input of a user in a plurality of manners. For example, the input device 305 may be a mouse, a keyboard, a touchscreen device, a sensing device, or the like.

The network device 20 includes at least one processor 201, at least one memory 202, at least one transceiver 203, and at least one network interface 204. The processor 201, the memory 202, the transceiver 203, and the network interface 204 are connected by using a bus. The network interface 204 is configured to connect to a core network device by using a link (for example, an S1 interface), or connect to a network interface of another access network device by using a wired or wireless link (for example, an X2 interface) (not shown in the figure). This is not specifically limited in this embodiment of this application. In addition, for related descriptions of the processor 201, the memory 202, and the transceiver 203, refer to descriptions of the processor 301, the memory 302, and the transceiver 303 in the terminal device 30. Details are not described herein again.

It should be noted that, according to an existing communications standard, if a system message sent by a network device is changed, a terminal device needs to re-read at least all content of a MIB and a SIB 1. However, in an actual situation, there are usually only some fields in a system message that frequently change, while other fields are relatively stable. If the system message is changed each time, the terminal device re-reads all content of a MIB system message and a SIB 1 system message, and working efficiency is extremely low. Particularly, in an NB-IoT, because a narrowband technology is used in a system, it takes a long time for the terminal device to obtain the system message, and power consumption is high. If this system message change method is still used, consumed costs of the terminal device are also higher. Therefore, the method provided in this embodiment of this application may be used to accelerate the terminal device in obtaining the change content of the system message, reduce power consumption of the terminal device, and reduce costs of the terminal device.

With reference to the network device 20 and the terminal device 30 shown in FIG. 2, the following describes in detail a system message indication method provided in the embodiments of this application by using an example in which the communications system 10 shown in FIG. 1 is applied to the NB-IoT.

Figure 3:
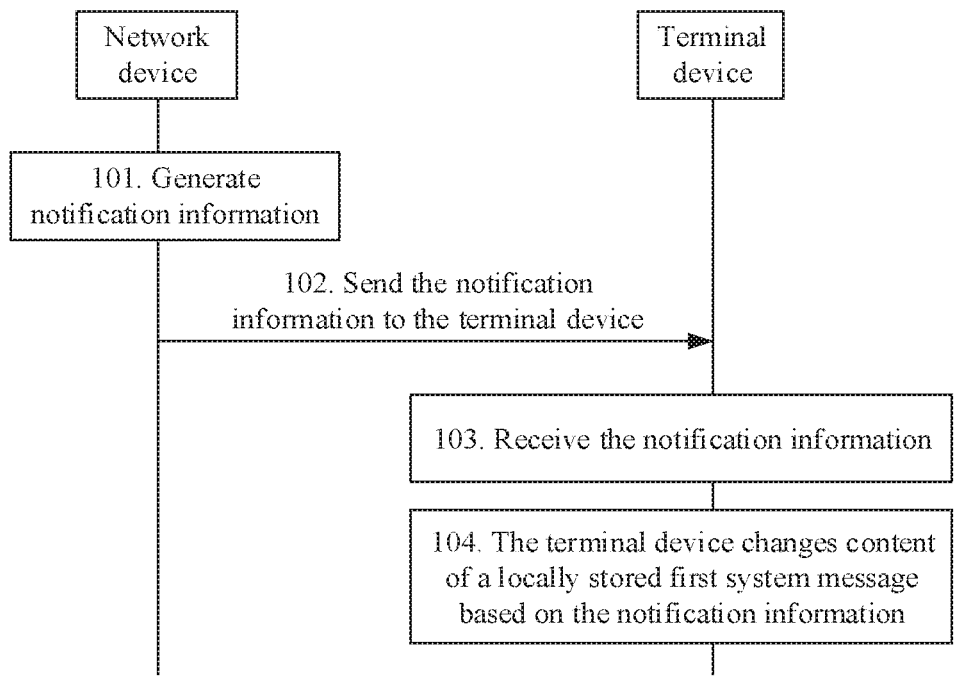
FIG. 3 is a flowchart of a system message indication method according to an embodiment of this application.

As shown in FIG. 3, an embodiment of this application provides a system message indication method. The method includes the following steps.

101. A network device generates notification information.

The notification information is used to indicate status information of first information. The first information includes at least one bit in a first system message, to be specific, the first information is used to indicate status information of the at least one bit in the first system message. Herein, the status information includes whether the first information is changed, and/or a value of the first information. It should be noted that the notification information may be further used to indicate whether second information is changed, and the second information includes at least one bit that is in the first system message and that is other than the first information. This is not limited in this embodiment of this application.

It should be noted that the first information may be set to frequently changed information in the first system message, and the second information may be set to the frequently changed information in the first system message. In this way, a terminal device can quickly obtain the frequently changed information in the first system message, thereby reducing a probability of reading the first system message by the terminal device, and helping reduce a delay of updating the first system message by the terminal device.

For example, the first system message may be a MIB, and the first information may be at least one of a first tag value (value tag), a system frame number, a first hyper frame number, and SIB 1 scheduling information in the MIB. For example, the first information may include the first tag value; and the second information may be at least one bit that is in the MIB and that is other than the first tag value, and the second information may specifically include the system frame number, and/or the first hyper frame number, and/or the SIB 1 scheduling information, and/or other information. In this case, because the first tag value in the MIB includes five bits, the notification information may be set to include five bits, and the five bits are used to indicate a value of the first tag value. In addition, the notification information may further include one bit, where the bit is used to indicate whether information that is in the MIB and that is other than the first tag value is changed. It should be noted that the first information may further include the first tag value and the system frame number, and the second information may include the first hyper frame number, and/or the SIB 1 scheduling information, and/or other information. The rest may be deduced by analogy. Content specifically included in the first information and the second information and specific content included in the notification information are not limited in this embodiment of this application.

For example, the first system message may alternatively be a SIB 1, and the first information may include at least one of at least one second tag value, a second hyper frame number, and second system message (System Information, SI) scheduling information. For example, the first information may include the second tag value; and the second information may be at least one bit that is in the SIB 1 and that is other than the second tag value, and may specifically include the second hyper frame number, and/or the second SI scheduling information, and/or other information. It should be noted that because a maximum of eight pieces of second SI can be invoked in the SIB 1, each piece of second SI corresponds to one second tag value, and each second tag value includes two bits. Therefore, the notification information may be set to include N*2 bits, where N is a quantity of pieces of second SI included in the SIB 1. The notification information may be set as every two bits indicating a value of a second tag value corresponding to one piece of second SI in the SIB 1. Optionally, the notification information may alternatively be set to include N bits, and each bit is used to indicate whether a second tag value corresponding to one piece of second SI in the SIB 1 is changed. In addition, the notification information may further include one bit, where the one bit is used to indicate whether information that is in the SIB 1 and that is other than the second tag value is changed. It should be noted that the first information may further include the second tag value and the second hyper frame number, and the second information may be the second SI scheduling information, and/or other information. Content specifically included in the first information and the second information and specific content included in the notification information are not limited in this embodiment of this application.

It should be noted that, in this embodiment of this application, a procedure of changing the first system message needs to be optimized, and a delay of reading the changed first system message by the terminal device is reduced. Therefore, a quantity of bits included in the first information herein is less than a quantity of bits included in the first system message.

It should be noted that the network device may use a dedicated message, a dedicated channel, or a dedicated signal to carry the notification information, or may use an existing message, channel, or signal to carry the notification information, for example, may use a direct indication message or a paging message to carry the notification information. For example, in an existing communications standard, the network device periodically sends the first system message. If the network device changes the first system message in this period, the network device usually sends a direct indication message or a paging message to the terminal device in a service area in a previous system message change period, to notify the terminal device that the first system message is changed. Then, after receiving the direct indication message or the paging message, the terminal device reads all content of the first system message in a next system message change period. For example, in this embodiment of this application, the network device may add the notification information to the direct indication message. A format of the direct indication message is shown in Table 1, and is as follows:

TABLE 1

Format of a direct indication message

| Bit | Field in Direct Indication information |
|---|---|
| 1 | System Info Modification |
| 2 | System Info Modification-eDRX |
| 3-8 | Not used, and shall be ignored by UE if received |

It can be learned from Table 1 that the direct indication message includes eight bits, where two bits are used to indicate whether the first system message is changed, and the remaining six bits are not used. Therefore, in this embodiment of this application, the six unused bits are used to carry the status information of the first information. For example, five bits are used to indicate the value of the first tag value in the first system message, and the other one bit is used to indicate whether information other than the first tag value in the first system message is changed.

102. The network device sends the notification information to the terminal device.

Specifically, the network device sends the notification information to the terminal device within a period of changing the first system message or within a next change period of changing the first system message. This is not limited in this embodiment of this application.

103. The terminal device receives the notification information.

104. The terminal device changes content of a locally stored first system message based on the notification information.

Specifically, if the notification information indicates a value of the first information, the terminal device updates content of the first information in the locally stored first system message to the value of the first information in the notification information. Optionally, the terminal device may continue to receive the changed first system message sent by the network device, or may no longer receive the changed first system message sent by the network device. This is not limited in this embodiment of this application.

If the notification information indicates that the first information is changed, and does not indicate the value of the first information, the terminal device receives the sent changed first system message, and changes, based on the received first system message, corresponding content in the locally stored first system message.

If the notification information indicates the value of the first information, and indicates whether the second information is changed, the terminal device first determines whether the second information is changed. If the notification information indicates that the second information is not changed, the terminal device directly updates the content of the first information in the locally stored first system message based on the notification information. If the notification information indicates that the second information is changed, the terminal device receives the changed first system message, and updates the locally stored first system message based on the changed first system message.

This embodiment of this application provides the system message indication method. If the network device changes the first system message, the network device generates the notification information, where the notification information is used to indicate the status information of the first information, and the first information is the at least one bit in the first system message; and sends the notification information to the terminal device. Therefore, the terminal device may update the locally stored first system message based on the notification information. Compared with that in the prior art, the network device sends, to the terminal device, only a notification that the first system message is changed, after receiving the notification, the terminal device still needs to read all content of the changed first system message. Consequently, working efficiency is low, and a delay is long. However, in this embodiment of this application, if the frequently changed information in the first system message is set to the first information, in this case, the terminal device can update the locally stored first system message based only on the notification information. This helps reduce a probability that the terminal device reads all the content of the changed first system message; helps improve working efficiency of the terminal device, reduce a delay, and reduce power consumption; and helps reduce costs.

Figure 4:
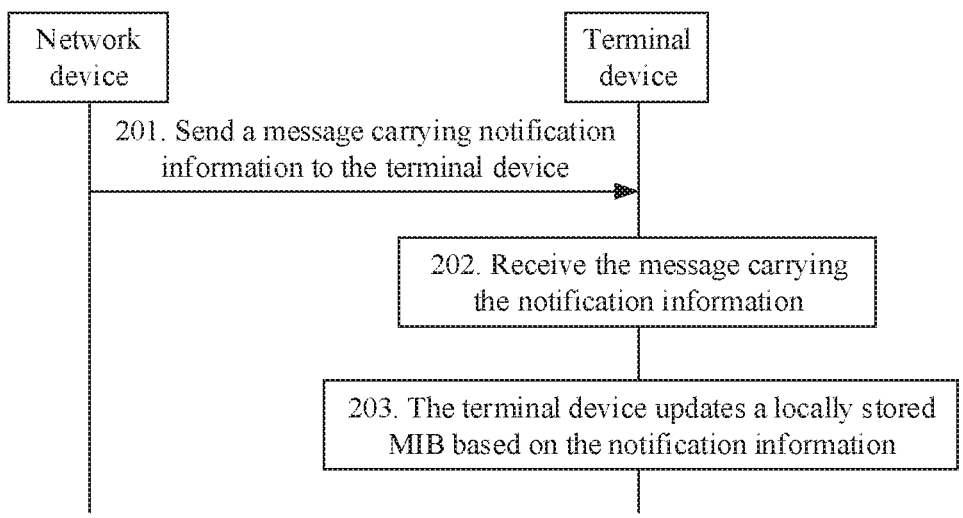
FIG. 4 is a schematic flowchart of still another system message indication method according to an embodiment of this application.

As shown in FIG. 4; the method in this embodiment of this application is described below by using an example in which the first system message is a MIB and with reference to a specific application scenario.

201. A network device sends a message carrying notification information a terminal device.

Specifically, the notification information may be carried by using a dedicated message, a dedicated channel, or a dedicated signal, or the notification information may be carried by using an existing message, channel, or signal, for example, may be carried by using a direct indication message or a paging message. This is not limited in this embodiment of this application.

For example, because in an NB-IoT, a first tag value may be understood as a version number of a MIB, when any piece of information (except some particular information agreed on in a protocol, for example, access and bearer control information) in a system message is changed, the first tag value is changed; that is, there is a high probability that the first tag value is changed. Therefore, first information may be set to include the first tag value, and the notification information is used to indicate a value of the first tag value. Specifically, the notification information may be carried in the direct indication message. Because the first tag value in the MIB includes five bits, five bits in unused bits in the direct indication message may be used to indicate the value of the first tag value in the MIB. It should be noted that the "five bits" herein is merely an example, and a specific quantity of bits for indicating the value of the first information is not limited in this embodiment of this application.

For example, considering that information other than first tag value may be changed in the MIB, when the first information is set to the first tag value, at least one bit that is in the MIB and that is other than the first tag value is set to second information, and the second information may specifically include a system frame number, and/or a first hyper frame number, and/or SIB 1 scheduling information, and/or other information. In this case, the notification information is used to indicate change content of the first tag value and whether the second information other than the first tag value is changed. Specifically, one bit in the unused bits in the direct indication message may be used to indicate whether the second information in the MIB is changed. If a value of the bit is "0", it indicates that the second information in the MIB is not changed. If a value of the bit is "1", it indicates that the second information in the MIB is changed.

For example, in addition to the first tag value, the SIB 1 scheduling information in the MIB may also be changed. In this case, the first information may further be set to the first tag value and the SIB 1 scheduling information. Therefore, the notification information is used to indicate a value used of the first tag value and a value of the SIB 1 scheduling information. Specifically, a new dedicated message may be added to carry the notification information. The five bits are used to indicate the value of the first tag value, and for example, four bits are used to indicate the value of the SIB 1 scheduling information. It should be noted that the five bits and the four bits herein are merely an example, and a specific quantity of bits for indicating the value of the first information and the value of the second information is not limited in this embodiment of this application. In addition, one bit may be further used to indicate whether the second information that is in the MIB and that is other than the first tag value and the SIB 1 scheduling information is changed. For a setting method, refer to the foregoing descriptions, and details are not described again.

202. The terminal device receives the message carrying the notification information.

203. The terminal device updates a locally stored MIB based on the notification information.

Specifically, the terminal device obtains the notification information from the received message carrying the notification information, and then changes related content of the locally stored MIB based on content in the notification information.

For example, if the notification information indicates only a value of the first tag value in the MIB, the terminal device may directly update the first tag value in the locally stored MIB to a value of the first tag value in the notification information.

For example, if the notification information includes information indicating the value of the first tag value in the MIB and whether the second information in the MIB is changed, the terminal device first determines whether the second information in the MIB is changed. If the second information is not changed, the terminal device may directly update the value of the first tag value in the locally stored MIB based on the notification information. The terminal device may not need to receive the changed MIB. If the second information is changed, the terminal device receives the changed. MIB, and updates the related content of the locally stored MIB based on the received changed MIB.

For example, if the notification information indicates the value of the first tag value in the MIB and the value of the SIB 1 scheduling information in the MIB, in this case, the terminal device may directly update the value of the first tag value in the locally stored MIB and the value of the SIB 1 scheduling information in the locally stored MIB based on the notification information.

If the notification information further includes the information indicating whether the second information that is in the MIB and that is other than the first tag value and the SIB 1 scheduling information is changed, the terminal device first determines whether the second information in the MIB is changed. If the second information is not changed, the terminal device may directly update the value of the first tag value in the locally stored MIB and the value of the SIB 1 scheduling information in the locally stored MIB based on the notification information. The terminal device may not need to receive the changed MIB. If the second information is changed, the terminal device receives the changed MIB, and updates the related content of the locally stored MIB based on the received changed. MIB.

301. A network device sends a message carrying notification information to a terminal device.

Specifically, the notification information may be carried by using a dedicated message, a dedicated channel, or a dedicated signal, or the notification information may be carried by using an existing message, channel, or signal, for example, may be carried by using a direct indication message or a paging message. This is not limited in this embodiment of this application.

For example, in the NB-IoT, the SIB 1 includes a maximum of eight pieces of second SI, and each piece of second SI corresponds to one two-bit second tag value. In addition, there is a relatively high probability that a second tag value is changed. Therefore, first information may be set to include the second tag value. Specifically, a new dedicated message may be added to carry the notification information. The notification information includes N*2 bits, where N is a quantity of pieces of second SI included in the SIB 1, Every two bits in the notification information are used to indicate a value of a second tag value corresponding to one piece of second. SI. Optionally, the notification information may alternatively include N bits, and each bit is used to indicate whether the second tag value corresponding to one piece of second SI is changed. It should be noted that the "N*2 bits" herein is merely an example, and a specific quantity of bits for indicating a value of the first information is not limited in this embodiment of this application.

For example, considering that information other than the second tag value may be changed in the SIB 1, when the first information is set to the second tag value, at least one bit that is in the SIB 1 and that is other than the second tag value is set to the second information, and the second information may specifically include a second hyper frame number, and/or second SI scheduling information, and/or other information. In this case, the notification information is used to indicate change content of the second tag value and whether the second information other than the second tag value is changed. Specifically, one hit in the dedicated message may be used to indicate whether the second information in the SIB 1 is changed. If a value of the hit is "0", it indicates that the second information in the SIB 1 is not changed. If a value of the bit is "1", it indicates that the second information in the SIB 1 is changed.

For example, in addition to the second tag value, the second SI scheduling information in the SIB 1 may also be changed. In this case, the first information may further be set to the second tag value and the second SI scheduling information. Therefore, the notification information is used to indicate a value of the second tag value and a value of the second SI scheduling information. Specifically, the N*2 bits in the dedicated message may be used to indicate the value of the second tag value, and other bits whose quantity is a positive integer are used to indicate the value of the second SI scheduling information. In addition, one bit may be further used to indicate whether information that is in the SIB 1 and that is other than the second tag value and the second SI scheduling information is changed. For a setting method, refer to the foregoing descriptions, and details are not described again.

302. The terminal device receives the message carrying the notification information.

303. The terminal device updates a locally stored SIB 1 based on the notification information.

Specifically, the terminal device obtains the notification information from the received message carrying the notification information, and then changes related content of the locally stored SIB 1 based on content in the notification information.

For example, if the notification information indicates only the value of the second tag value in the SIB 1, the terminal device may directly update the second tag value in the locally stored SIB 1 to the value of the second tag value in the notification information.

For example, if the notification information indicates the value of the second tag value in the SIB 1 and information indicating whether the second information that is in the SIB 1 and that is other than the second tag value is changed, the terminal device first determines whether the second information in the SIB 1 is changed. If the second information is not changed, the terminal device may directly update the value of the second tag value in the locally stored SIB 1 based on the notification information. The terminal device may not need to receive the changed SIB 1. If the second information is changed, the terminal device receives the changed SIB 1, and updates the related content of the locally stored SIB 1 based on the received changed SIB 1.

For example, if the notification information indicates the value of the second tag value in the SIB 1 and the value of the second SI scheduling information in the SIB 1, in this case, the terminal device may directly update the value of the second tag value in the locally stored SIB 1 and the value of the second SI scheduling information in the locally stored SIB 1 based on the notification information.

If the notification information further includes the information indicating whether the second information that is in the SIB 1 and that is other than the second tag value and the second SI scheduling information is changed, the terminal device first determines whether the second information the SIB 1 is changed. If the second information is not changed, the terminal device may directly update the value of the second tag value in the locally stored SIB 1 and the value of the second. SI scheduling information in the locally stored SIB 1 based on the notification information. The terminal device may not need to receive the changed SIB 1. If the second information is changed, the terminal device receives the changed SIB 1, and updates the related content of the locally stored SIB 1 based on the received changed SIB 1.

The foregoing mainly describes the solutions provided in the embodiments of this application from a perspective of interaction between the terminal device and the network device. It may be understood that, to implement the foregoing functions, the network device and the terminal device include corresponding hardware structures or software modules for performing the functions. A person of ordinary skill in the art should easily be aware that, in combination with the examples described in the embodiments disclosed in this specification, units, and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the network device and the terminal device may be divided based on the foregoing method examples. For example, each functional module may be divided corresponding to each function, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, and there may be other division manners in actual implementation.

Figure 6:
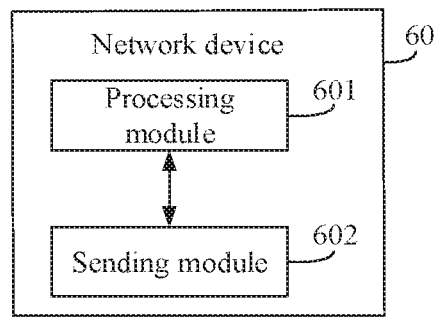
FIG. 6 is a schematic structural diagram of a network device according to an embodiment of this application.

For example, when each functional module is divided by using each corresponding function, FIG. 6 is a possible schematic structural diagram of a network device 60 in the foregoing embodiments. As shown in FIG. 6, the network device 60 includes a processing module 601 and a sending module 602.

The processing module 601 is configured to support the network device 60 in performing step 101 in FIG. 3, and the sending module 602 is configured to support the network device 60 in performing step 102 in FIG. 3.

Alternatively, the sending module 602 is configured to support the network device 60 in performing step 201 in FIG. 4.

Figure 5:
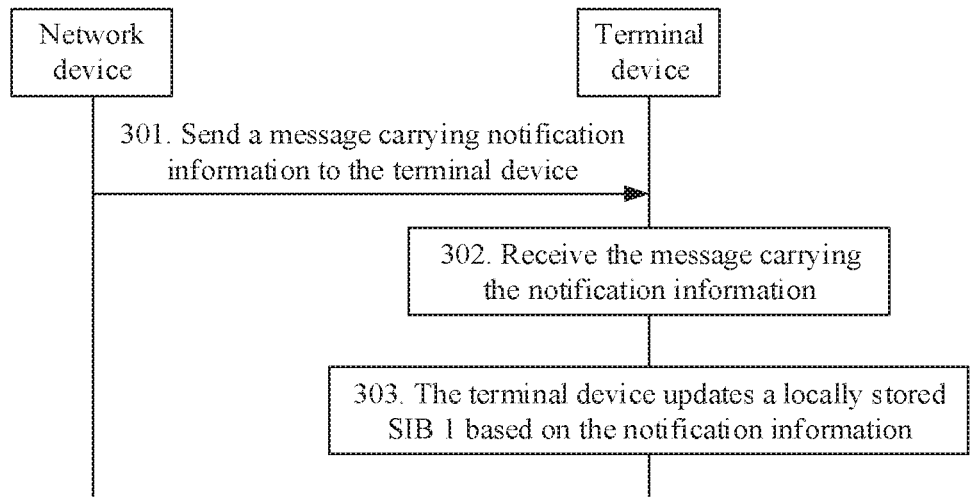
FIG. 5 is a schematic flowchart of still another system message indication method according to an embodiment of this application.

Alternatively, the sending module 602 is configured to support the network device 60 in performing step 301 in FIG. 5.

In this embodiment of this application, the network device is presented in a form in which functional modules are divided corresponding to functions, or the network device is presented in a form in which functional modules are divided in an integrated manner. The "module" herein may include an application-specific integrated circuit (Application-Specific integrated Circuit, ASIC), a circuit, a processor and a memory that execute one or more software programs or firmware programs, an integrated logic circuit, or another component that can provide the foregoing functions. In a simple embodiment, a person skilled in the art may figure out that the network device 60 may use a form of the network device 20 shown in FIG. 2. For example, the processing module 601 in FIG. 6 may be implemented by using the processor 201 and the memory 202 in the network device 20 in FIG. 2. Specifically, the sending module 602 may be implemented by the processor 201 by invoking the application program code stored in the memory 202. This is not limited in this embodiment of this application.

The network device provided in this embodiment of this application may be configured to perform the foregoing system message indication method. Therefore, for technical effects that can be achieved by the network device, refer to the foregoing method embodiments, and details are not described herein again in this embodiment of this application.

Figure 7:
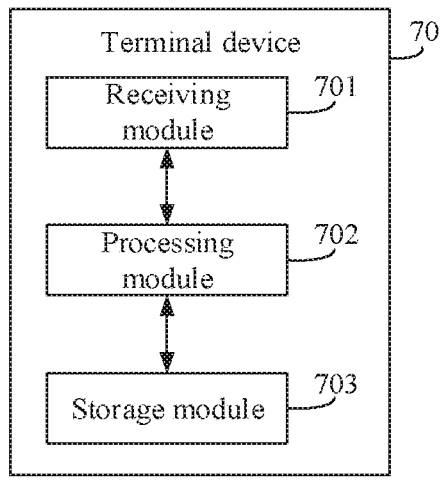
FIG. 7 is a schematic structural diagram of a terminal device according to an embodiment of this application.

For example, when each functional module is divided by using each corresponding function, FIG. 7 is a possible schematic structural diagram of a terminal device 70 in the foregoing embodiments. As shown in FIG. 7, the terminal device 70 includes a receiving module 701 and a processing module 702.

The receiving module 701 is configured to support the terminal device 70 in performing step 103 in FIG. 3, and the processing module 702 is configured to support the terminal device 70 in performing step 104 in FIG. 3.

Alternatively, the receiving module 701 is configured to support the terminal device 70 in performing step 202 in FIG. 4; and the processing module 702 is configured to support the terminal device 70 in performing step 203 in FIG. 4.

Alternatively, the receiving module 701 is configured to support the terminal device 70 in performing step 302 in FIG. 5; and the processing module 702 is configured to support the terminal device 70 in performing step 303 in FIG. 4.

The terminal device 70 may further include a storage module 703, configured to store generated or processed data, and a generated or processed program.

All related content of the steps in the foregoing method embodiments may be cited in function descriptions of corresponding functional modules, and details are not described herein again.

In this embodiment of this application, the terminal device is presented in a form in which functional modules are divided corresponding to functions, or the terminal device is presented in a form in which functional modules are divided in an integrated manner. The "module" herein may include an application-specific integrated circuit (Application-Specific Integrated Circuit, ASIC), a circuit, a processor and a memory that execute one or more software programs or firmware programs, an integrated logic circuit, or another component that can provide the foregoing functions. In a simple embodiment, a person skilled in the art may figure out that the terminal device 70 may use a form of the terminal device 30 shown in FIG. 2. For example, the processing module 701 in FIG. 7 may be implemented by using the processor 301 in the terminal device 30 in FIG. 2. Specifically, the receiving module 701 may be implemented by the processor 301 by invoking the application program code stored in the memory 302. This is not limited in this embodiment of this application.

The terminal device provided in this embodiment of this application may be configured to perform the foregoing system message indication method. Therefore, for technical effects that can be achieved by the network device, refer to the foregoing method embodiments, and details are not described herein again in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A system message indication method, comprising:
   generating, by a network device, notification information, wherein the notification information indicates that first information is changed to a changed value, the notification information comprises the changed value of the first information, the first information comprises at least one bit that is in a first system message, and a quantity of bits comprised in the first information is less than a quantity of bits comprised in the first system message, wherein:
   the notification information further comprises N bits, and wherein N is a quantity of pieces of second system information (SI) included in a system information block (SIB) 1, and each bit of the N bits indicates whether a second tag value corresponding to one piece of the second SI in the SIB 1 is changed, or
   the notification information further comprises N*2 bits, and wherein every two bits of the notification information indicates a value of a second tag value corresponding to one piece of the second SI in the SIB 1; and
   sending, by the network device, the notification information to a terminal device.

2. The method according to claim 1, wherein the notification information further indicates whether second information is changed, and the second information comprises at least one bit that is in the first system message and that is other than the first information.

3. The method according to claim 1, wherein the first system message is a master information block (MIB) or the SIB 1.

4. The method according to claim 3, wherein the first system message is the MIB, and the first information comprises at least one of a first tag value, a system frame number, a first hyper frame number, and SIB 1 scheduling information.

5. A system message indication method, comprising:
   receiving, by a terminal device, notification information sent by a network device, wherein the notification information indicates that first information is changed to a changed value, the notification information comprises the changed value of the first information, the first information comprises at least one bit that is in a first system message, and a quantity of bits comprised in the first information is less than a quantity of bits comprised in the first system message, wherein:

the notification information further comprises N bits, and wherein N is a quantity of pieces of second system information (SI) included in a system information block (SIB) 1, and each bit of the N bits indicates whether a second tag value corresponding to one piece of the second SI in the SIB 1 is changed, or the notification information further comprises N*2 bits, and wherein every two bits of the notification information indicates a value of a second tag value corresponding to one piece of the second SI in the SIB 1; and changing, by the terminal device, content of a locally stored first system message based on the notification information.

6. The method according to claim 5, wherein the notification information further indicates whether second information is changed, and the second information comprises at least one bit that is in the first system message and that is other than the first information.

7. The method according to claim 5, wherein changing, by the terminal device, the content of the locally stored first system message based on the notification information comprises:

reading, by the terminal device, the changed value of the first information in the notification information; and updating the locally stored first system message based on the changed value of the first information.

8. The method according to claim 5, wherein the first system message is a master information block (MIB) or the SIB 1.

9. An apparatus, comprising:

a transmitter; and at least one processor coupled to a non-transitory computer-readable storage medium storing programming instructions for execution by the at least one processor, wherein the programming instructions cause the at least one processor to:

generate notification information, wherein the notification information indicates that first information is changed to a changed value, the notification information comprises the changed value of the first information, the first information comprises at least one bit that is in a first system message, and a quantity of bits comprised in the first information is less than a quantity of bits comprised in the first system message, wherein:

the notification information further comprises N bits, and wherein N is a quantity of pieces of second system information (SI) included in a system information block (SIB) 1, and each bit of the N bits indicates whether a second tag value corresponding to one piece of the second SI in the SIB 1 is changed, or the notification information further comprises N*2 bits, and wherein every two bits of the notification information indicates a value of a second tag value corresponding to one piece of the second SI in the SIB 1, and wherein the programming instructions cause the transmitter to:

send, to a terminal device, the notification information.

10. The apparatus according to claim 9, wherein the notification information further indicates whether second information is changed, and the second information comprises at least one bit that is in the first system message and that is other than the first information.

11. The apparatus according to claim 9, wherein the first system message is a master information block (MIB) or the SIB 1.

12. The apparatus according to claim 11, wherein the first system message is the MIB, and the first information comprises at least one of a first tag value, a system frame number, a first hyper frame number, and SIB 1 scheduling information.

13. An apparatus, comprising:

a memory;

a receiver; and at least one processor coupled to the memory that stores programming instructions for execution by the at least one processor, wherein the programming instructions cause the receiver to:

receive notification information sent by a network device, wherein the notification information indicates that first information is changed to a changed value, the notification information comprises the changed value of the first information, the first information comprises at least one bit that is in a first system message, and a quantity of bits comprised in the first information is less than a quantity of bits comprised in the first system message, wherein:

the notification information further comprises N bits, and wherein N is a quantity of pieces of second system information (SI) included in a system information block (SIB) 1, and each bit of the N bits indicates whether a second tag value corresponding to one piece of the second SI in the SIB 1 is changed, or the notification information further comprises N*2 bits, and wherein every two bits of the notification information indicates a value of a second tag value corresponding to one piece of the second SI in the SIB 1, and wherein the programming instructions cause the at least one processor to:

change, based on the notification information received by the receiver, content of the first system message stored by the memory.

14. The apparatus according to claim 13, wherein the notification information further indicates whether second information is changed, and the second information comprises at least one bit that is in the first system message and that is other than a first tag value.

15. The apparatus according to claim 13, wherein the programming instructions cause the at least one processor to:

read the changed value of the first information in the notification information; and update, based on the changed value of the first information, the first system message stored by the memory.

16. The apparatus according to claim 13, wherein the first system message is a master information block (MIB) or the SIB 1.

17. The method according to claim 3, wherein the first system message is the SIB 1, and the first information further comprises at least one of the second tag value, a second hyper frame number, and second SIB 1 scheduling information.

18. The method according to claim 1, wherein the first system message is the SIB 1, the first information further comprises the second tag value, and the notification information further includes a second bit, wherein the second bit indicates whether information that is in the SIB 1 and that is other than the second tag value is changed.

* * * * *